Patented June 12, 1928.

1,673,549

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR TREATING RUBBER WITH ALDEHYDE AMINE CONDENSATION PRODUCTS AND PRODUCT.

No Drawing.  Application filed January 7, 1927.  Serial No. 159,746.

This invention relates to a process for retarding the deterioration of rubber and similar materials such as balata and gutta percha. It is known that rubber undergoes a marked deterioration due principally to two causes, one of which is oxidation and the other overvulcanization. The present invention is more specifically concerned with retarding the deterioration which is the result of oxidation.

The principal object of the invention is to retard the deterioration through oxidation of rubber by adding to the unvulcanized rubber or similar material an excess of a vulcanization accelerating aldehyde amine condensation product. Another object is to prepare rubber compounds which are not liable to oxidation, and which at the same time are not discolored appreciably by the introduction of an agent to retard said oxidation. A further object is to retard the deterioration through oxidation of rubber by adding thereto an excess of a triazine compound.

The invention comprises combining with the unvulcanized rubber or similar material an accelerating formaldehyde condensation product of an aliphatic amine which has the property of retarding the deterioration by oxidation of rubber, said condensation product having this property during and after vulcanization. The invention also includes adding an excess of a vulcanization accelerating condensation product of formaldehyde and an aliphatic amine to a rubber compound containing sufficient ingredients to accomplish vulcanization. The invention also includes adding a 1-3-5 hexa hydro triazine to rubber, gutta percha or balata.

One of the above condensation products, for instance a formaldehyde condensation product of ethylamine N triethyl 1-3-5 hexahydro triazine, is added in an excess, by which is meant an excess over the amount which is required to give a proper degree of vulcanization. This amount is capable of variation, but in all instances an excess is considered to include any amount greater than 1%, in those instances where the condensation product is also used as an accelerator. Where the rubber compound contains another material as accelerator, the amount of condensation product may of course be reduced.

Overvulcanization may be precluded by the use of only sufficient sulphur to accomplish the desired state of vulcanization. The sulphur is substantially exhausted during the vulcanization, whereupon the N triethyl 1-3-5 hexahydro triazine having no more sulphur with which to cause vulcanization, cannot contribute to overvulcanization, but is available to retard deterioration through oxidation. Although the amount of sulphur employed in rubber compounds may be varied, it is preferable in most instances to employ 5 parts by weight of accelerating product on 100 parts of rubber or less. With the above formaldehyde-ethylamine condensation product as an accelerator, 3 parts or even 2 parts of sulphur are sufficient. When 3 parts of sulphur are employed in a compound, the amount of condensation product may be from 6-10 parts. Such a compound after vulcanization will be found to give products which age at least 500% better than stocks containing no such excess of the condensation product. When 2 parts of sulphur are present, 5 parts of condensation product will give about the same results. If it be desired to use less than 5 parts of condensation product in a rubber compound, it is preferable to use less than 2 parts of sulphur in the same compound. In this latter instance it is of course understood that part of the product is utilized to accomplish the desired degree of vulcanization.

One of these condensation products is obtained by the interaction of formaldehyde and ethylamine. Any of the other condensation products formed from these materials may be used, employing various ratios of aldehyde to amine. Or, mixtures of more than one condensation product may be employed. Other aliphatic amines may be used with formaldehyde, or the latter may be substituted by other aldehydes. Illustrations of such compounds are N triallyl 1-3-5 hexahydro triazine, N tribenzyl 1-3-5 hexahydro triazine, N tributyl 1-3-5 hexahydro triazine, 1 cyan 2 imido 4-6 dimethyl hexahydro triazine. If desired, the condensation products may be combined or mixed with other materials. Stearic acid is an illustration of one type of such material.

If a compound comprising 100 parts of rubber, 10 parts of zinc oxide, 3 parts of sulphur and ⅜ part of N triethyl 1-3-5 hexahydro triazine be vulcanized for 30 minutes at 40 lbs. steam pressure, the stock will have a tensile strength of about 3015 lbs., and at 60 minutes a tensile of 3780 lbs. A similar compound containing 10 parts of N triethyl 1-3-5 hexahydro triazine will have a tensile strength of approximately 4515 lbs. when vulcanized at the above steam pressure for 30 minutes and of 4120 lbs. when vulcanized for 60 minutes. Upon aging these two stocks at 212° F. for 140 hrs. the tensile strength of the stock containing ⅜ part of this condensation product is 102 for the 30 minute cure and 105 for the 60 minute cure. The stock containing 10 parts of condensation product shows a tensile strength of 2495 for the 30 minute cure and 1790 for the 60 minute cure. A comparison of these two rubber compounds shows that a marked improvement in the age resistance has been produced by the use of an excess of the condensation product. It may also be observed that the excess has not wrought any substantial change upon the rate of vulcanization. A rubber compound containing 100 rubber, 5 zinc oxide, 2.6 sulphur and 5 of N triethyl 1-3-5 hexahydro triazine, when vulcanized say for 60 minutes at 40 lbs. shows a greatly improved resistance to sun cracking.

The above rubber compounds may be vulcanized in heated air to give non-blooming products. One of the marked advantages of the formaldehyde ethyl amine condensation products is that they show but little tendency to discolor the rubber compound, and for this reason are eminently suitable for white stocks. The aging properties, especially the resistance to deterioration by oxidation, are far superior with N triethyl 1-3-5 hexahydro triazine than with hexamethylenetetramine, diphenylguanidine, thiocarbanilid and other accelerators which have been considered for vulcanizing white rubber compounds in heated air.

The hexahydro 1-3-5 triazines impart especially good age resisting qualities to rubber, and the improvement which they yield is quite apparent in heat aging in air at 158° F. or at 212° F., in oxygen under 300 lbs. pressure per sq. in. at 140° F. as well as improving aging in sunlight, including an improved resistance to cracking in the sunlight when the stocks containing these compounds are bent. A marked improvement is wrought upon the aging of gutta percha and balata as well as upon unvulcanized rubber. 5 parts of N triethyl 1-3-5 hexahydro triazine or one of the other compounds herein mentioned may be used to splendid advantage in either gutta percha or balata. It is pointed out that it is not necessary to vulcanize in order to secure the full effect of improvement in resistance to deterioration by oxidation.

A compound comprising 100 parts by weight of rubber, 100 parts of zinc oxide, 3 parts of sulphur and 10 parts of N triethyl 1-3-5 hexahydro triazine will give a tensile strength of about 4000 lbs. when freshly vulcanized. After 200 hrs. aging at 212° F. this same stock still showed a tensile strength of 1860 lbs. With this compound it required 900 hrs. in oxygen under 300 lbs. pressure at 140° F. to cause complete deterioration. This length of time in oxygen is equivalent to approximately 20 years of service.

Where the condensation products are soluble in water, they may be added to latex, either artificial or natural, fresh, preserved, or otherwise treated. Insoluble products may be added to latex or to rubber as emulsions, suspensions or dispersions. N triethyl 1-3-5 hexahydro triazine may be added to latex in the following proportions: 3 parts by weight of accelerator to 100 parts of rubber as ordinary latex, or to 100 parts of rubber as latex vulcanized with oxy normal butyl thiocarbonic acid disulphide, or to 100 parts of rubber in the form of latex vulcanized with sodium dithiobenzoate. The above amount of triazine will improve the aging of a film of rubber by 100%, and definitely improves the aging of a film or deposit laid down on a porous form, and particularly in the case of the latex vulcanized with oxy normal butyl thiocarbonic acid disulphide.

Vulcanization in the presence of these 1-3-5 hexahydro triazines may be accomplished in any suitable way. The invention is not limited to any particular method of vulcanization, nor to any particular manner of introducing the products, nor to any one form of rubber. The invention contemplates the treatment of unvulcanized rubber in any form or physical conditions, and the word "rubber" is to be construed as including the various sources and kinds of rubber, and including gutta percha and balata.

In the appended claims the expression "excess of that required to secure vulcanization" is meant to indicate that a suitable amount of sulphur is present in the stock so that overvulcanization does not take place.

Having thus described my invention, what I claim and desire to protect by Letters Patent is:

1. A process for retarding the oxidation of rubber which comprises incorporating with unvulcanized rubber an accelerating aldehyde-aliphatic amine condensation product in excess of that required to secure proper vulcanization.

2. A process for retarding the oxidation of rubber which comprises adding to unvulcanized rubber an accelerating formaldehyde primary aliphatic amine condensation product in excess of the quantity normally required to yield a properly vulcanized stock.

3. A process for retarding the oxidation of rubber which comprises adding to unvulcanized rubber an accelerating 1-3-5 hexahydro triazine product in excess of the quantity normally required to yield a properly vulcanized stock.

4. A process for retarding the oxidation of rubber compounds which comprises adding to an unvulcanized rubber compound containing not more than approximately 3% of sulphur, an amount of a formaldehyde-ethylamine condensation product, which is in excess of that required to react completely with the sulphur during vulcanization, said excess being available during and after vulcanization to retard deterioration of said rubber compound through oxidation.

5. A process for retarding the oxidation of rubber which comprises mixing more than approximately 5 parts of a formaldehyde-ethylamine condensation product with an unvulcanized rubber compound containing not more than approximately 3 parts of sulphur, said condensation product being present in an amount more than sufficient to insure proper vulcanization and said amount of sulphur being sufficiently limited that overvulcanization cannot occur, and vulcanizing the rubber.

6. The process for retarding the oxidation of rubber compound which comprises incorporating with the rubber an amount of sulphur sufficient to secure proper vulcanization, and an amount of a formaldehyde condensation product of a primary aliphatic amine in appreciable excess of the quantity required to secure proper vulcanization in the presence of the amount of sulphur employed, the ratio of sulphur to condensation product being such that substantially no after vulcanization can take place, and the excess of condensation product being thereupon available to prevent oxidation during and after vulcanization, and vulcanizing the rubber.

7. A process for retarding the oxidation of rubber compounds which comprises adding, to an unvulcanized rubber compound containing not more than approximately 3% of sulphur, an amount of N-triethyl 1-3-5 hexahydro triazine which is in excess of that required to react completely with the sulphur during vulcanization, said excess being available during and after vulcanization to retard deterioration of said rubber compound through oxidation.

8. A process for retarding the oxidation of rubber which comprises mixing more than approximately 5 parts of N-triethyl 1-3-5 hexahydro triazine with an unvulcanized rubber compound containing not more than approximately 3 parts of sulphur, said triazine being present in an amount more than sufficient to insure proper vulcanization, and said amount of sulphur being sufficiently limited that overvulcanization cannot occur and vulcanizing the rubber.

9. The process for retarding the oxidation of rubber compound which comprises incorporating with the rubber an amount of sulphur sufficient to secure proper vulcanization, and an amount of N triethyl 1-3-5 hexahydro triazine in appreciable excess of the quantity required to secure proper vulcanization in the presence of the amount of sulphur employed, the ratio of sulphur to triazine being such that substantially no after vulcanization can take place, and the excess of triazine being thereupon available to prevent oxidation during and after vulcanization, and vulcanizing the rubber.

10. A method for retarding the oxidation of rubber, gutta percha and balata which comprises adding thereto an excess of a 1-3-5 hexahydro triazine.

11. Vulcanized rubber containing sulphur in substantially complete combination with the rubber and an aldehyde aliphatic amine condensation product in excess of the amount required to give proper vulcanization, said rubber compound being characterized by the property of having a high resistance to oxidation.

12. Vulcanized rubber containing sulphur in substantially complete combination with the rubber and a formaldehyde primary aliphatic amine condensation product in excess of the amount required to give proper vulcanization, said rubber compound being characterized by the property of having a high resistance to oxidation.

13. Vulcanized rubber containing sulphur in substatnially complete combination with the rubber and a 1-3-5 hexahydro triazine in excess of the amount required to give proper vulcanization, said rubber compound being characterized by the property of having a high resistance to oxidation.

14. Vulcanized rubber containing sulphur in substantially complete combination with the rubber and N triethyl 1-3-5 hexahydro triazine in excess of the amount required to give proper vulcanization, said rubber compound being characterized by the property of having a high resistance to oxidation.

15. Vulcanized rubber containing less than approximately 3 parts of sulphur and at least approximately 5 parts of a formaldehyde ethyl amine condensation product, said rubber compound being characterized by the property of having a high resistance to oxidation.

16. Vulcanized rubber containing less than approximately 3 parts of sulphur and at least approximately 5 parts of N triethyl 1-3-5 hexahydro triazine, said rubber compound being characterized by the property of having a high resistance to oxidation.

17. Vulcanized rubber containing less than approximately 3 parts of sulphur and more than approximately 5 parts of a formaldehyde ethyl amine condensation product, said rubber compound being characterized by the property of having a high resistance to oxidation, and free from discoloration by said condensation product.

18. Vulcanized rubber containing less than approximately 3 parts of sulphur and more than approximately 5 parts of 1-3-5 hexahydro triazine, said rubber compound being characterized by the property of having a high resistance to oxidation, and free from discoloration by said condensation product.

19. Vulcanized rubber containing less than approximately 3 parts of sulphur and more than approximately 5 parts of N triethyl 1-3-5 hexahydro triazine, said rubber compound being characterized by the property of having a high resistance to oxidation, and free from discoloration by said condensation product.

20. Vulcanized white rubber compounds containing less than approximately 3% of sulphur and more than approximately 5% of a formaldehyde ethyl amine condensation product, said white compounds being free from discoloration and characterized by a high resistance to deterioration through oxidation.

21. Vulcanized white rubber compounds containing less than approximately 3% of sulphur and more than approximately 5% of N triethyl 1-3-5 hexahydro triazine, said white compounds being free from discoloration and characterized by a high resistance to deterioration through oxidation.

Signed at New York, county and State of New York, this 29th day of December, 1926.

SIDNEY M. CADWELL.